United States Patent
Vahidsafa (10) Patent No.: US 9,746,876 B2
(45) Date of Patent: Aug. 29, 2017

(54) DRIFT COMPENSATION FOR A REAL TIME CLOCK CIRCUIT

(71) Applicant: Oracle International Corporation, Redwood City, CA (US)

(72) Inventor: Ali Vahidsafa, Palo Alto, CA (US)

(73) Assignee: Oracle International Corporation, Redwood City, CA (US)

(*) Notice: Subject to any disclaimer, the term of this patent is extended or adjusted under 35 U.S.C. 154(b) by 138 days.

(21) Appl. No.: 14/590,748

(22) Filed: Jan. 6, 2015

(65) Prior Publication Data

US 2016/0195894 A1 Jul. 7, 2016

(51) Int. Cl.
| | |
|---|---|
| G06F 1/04 | (2006.01) |
| G06F 1/24 | (2006.01) |
| G06F 11/00 | (2006.01) |
| G06F 1/08 | (2006.01) |
| G06F 1/12 | (2006.01) |
| G06F 1/14 | (2006.01) |
| G06F 1/10 | (2006.01) |
| H04L 7/00 | (2006.01) |
| H04J 3/06 | (2006.01) |

(52) U.S. Cl.
CPC ............ *G06F 1/08* (2013.01); *G06F 1/12* (2013.01); *G06F 1/10* (2013.01); *G06F 1/14* (2013.01); *H04J 3/0638* (2013.01); *H04J 3/0685* (2013.01); *H04L 7/0033* (2013.01)

(58) Field of Classification Search
CPC ...... G06F 1/14; G06F 1/12; G06F 1/08; G06F 1/10; H04L 7/0033; H04J 3/0685; H04J 3/0638
See application file for complete search history.

(56) References Cited

U.S. PATENT DOCUMENTS

| | | | | |
|---|---|---|---|---|
| 6,535,926 B1 * | 3/2003 | Esker | ............... | H04J 3/0638 713/503 |
| 2010/0268980 A1 * | 10/2010 | Watanabe | ............ | H04J 3/0685 713/340 |

* cited by examiner

*Primary Examiner* — Xuxing Chen
(74) *Attorney, Agent, or Firm* — Polsinelli PC (57) ABSTRACT

Implementations of the present disclosure involve an apparatus and/or method for adjusting a counter in a computing system to account for drift of the counter value over time compared to another counter of the system. In particular, a processor of the computing system that includes a local counter component may access a counter component of another processor of the system, referred to as the reference counter. By comparing the value of the reference counter to the local counter, the processor may determine any drift that may have occurred over a period of time in the local counter. The calculated drift, or counter error, may be converted into one or more adjustments to the local counter to synchronize the local counter with the reference counter. In one embodiment, the adjustment to the local counter includes increasing the rate at which the local counter is incremented for a period of time.

14 Claims, 8 Drawing Sheets

DRIFT COMPENSATION FOR A REAL TIME CLOCK CIRCUIT

FIELD OF THE DISCLOSURE

Aspects of the present invention relate to computing systems and, more particularly, aspects of the present invention involve a circuit, apparatus and/or method for synchronizing the time reference of a processor of the computing system to another processor.

BACKGROUND

Computers are everywhere in today's society. They come in all different varieties and can be found in places such as automobiles, laptops or home personal computers, banks, personal digital assistants, cell phones, and servers. In addition, as computers become more commonplace and software becomes more complex, there is a need for the computing devices to process more data at faster speeds using a smaller package and less power. Newer computing systems often have multiple processors with multiple processing cores running at higher operating frequencies than previous generations of processors, which often results in an increase in processing power for the processor. For example, newer server devices may run a plurality of such multi-core processors.

To take advantage of these multi-processor and multi-core processor systems, an emphasis in parallel computing has arisen. Parallel processing involves the breaking up of tasks into smaller ones and then distributing the tasks amongst the multiple processors and processor cores. The tasks are each completed independently and the results are then combined. This allows for large computational tasks to be completed in an efficient manner.

In order to synchronize these parallel computations, a system-wide time reference is typically used. In general, this system-wide time reference (referred to herein as a "real-time reference" or "system TICK" (STICK)) increments at a constant rate independent of processor or processor core clock frequencies such that the STICK can utilized by one or more programs to determine real-time. Thus, even a plurality of processors and multi-core processors operating at different clock rates may still perform parallel operations by referencing the STICK clock signal. The STICK may also be utilized by the processors to determine a real-time clock signal to pace the executing applications to real-time.

Some STICK implementations are based on a distributed scheme based on a common external crystal oscillator, with each processor or each processor core individually keeping its own copy of STICK. When a server or cluster is started, each copy of STICK is set at zero and started at approximately the same time. This may be done by broadcasting a signal to all of the processors to start their respective STICK counters over a dedicated wire to a reset pin on each processor. This allows for all of the STICK counters to be approximately equal.

If different groups of STICK registers operate on different crystal oscillators, over time the STICK clock for one or more of the processors or processor core may begin to drift such that the STICK clock is not synchronized between the processors. Significant clock drift can impact software behavior, possibly leading to a crash of the system. It is with these and other issues in mind that various aspects of the present disclosure were developed.

SUMMARY

One implementation of the present disclosure involves a method for operating a counter in a processor of a computing system. The method includes the operations of storing a first value of a local counter device of the processor of the computing system and a first value of a reference counter device, the local counter device configured to output an incrementing value based on a first clock signal and the reference counter device configured to output an incrementing value based on a second clock signal and, a period of time after storing the first value of the local counter device, obtaining a current value of the local counter device and a current value of the reference counter device. The method further includes calculating a drift in the local counter device by comparing an update rate of the local counter device to an update rate of the reference counter device and adjusting the incrementing value of the local counter device at least in response to the calculated drift in the local counter device.

Another implementation of the present disclosure involves a computer system comprising a first processor comprising a local counter device configured to output an incrementing value based on a first clock signal and a second processor comprising a reference counter device configured to output an incrementing value based on a second clock signal, the second clock signal different from the first clock signal. Further, the computer system is configured to store a first value of the local counter device of the first processor and a first value of the reference counter device of the second processor and, a period of time after storing the first value of the local counter device, obtain a current value of the local counter device and a current value of the reference counter device. The computer system is also configured to calculate a drift in the local counter device by comparing an update rate of the local counter device to an update rate of the reference counter device and adjust the incrementing value of the local counter device at least in response to the calculated drift in the local counter device.

DETAILED DESCRIPTION

Implementations of the present disclosure involve an apparatus and/or method for adjusting a counter in a computing system to account for drift of the counter value over time compared to another counter of the system. In particular, a processor of the computing system that includes a local counter component may access a counter component of another processor of the system, referred to as the reference counter. By comparing the value of the reference counter to the local counter, the processor may determine any drift that may have occurred over a period of time in the local counter. The calculated drift, or counter error, may be converted into one or more adjustments to the local counter to synchronize the local counter with the reference counter. In one embodiment, the adjustment to the local counter includes increasing the rate at which the local counter is incremented for a period of time. In another embodiment, the adjustment to the local counter includes decreasing the rate at which the local counter is incremented for a period of time. In addition, in one embodiment, the adjustments to the local counter may be spread apart in time to minimize one or more negative effects of the adjustment to the local counter.

Figure 1:
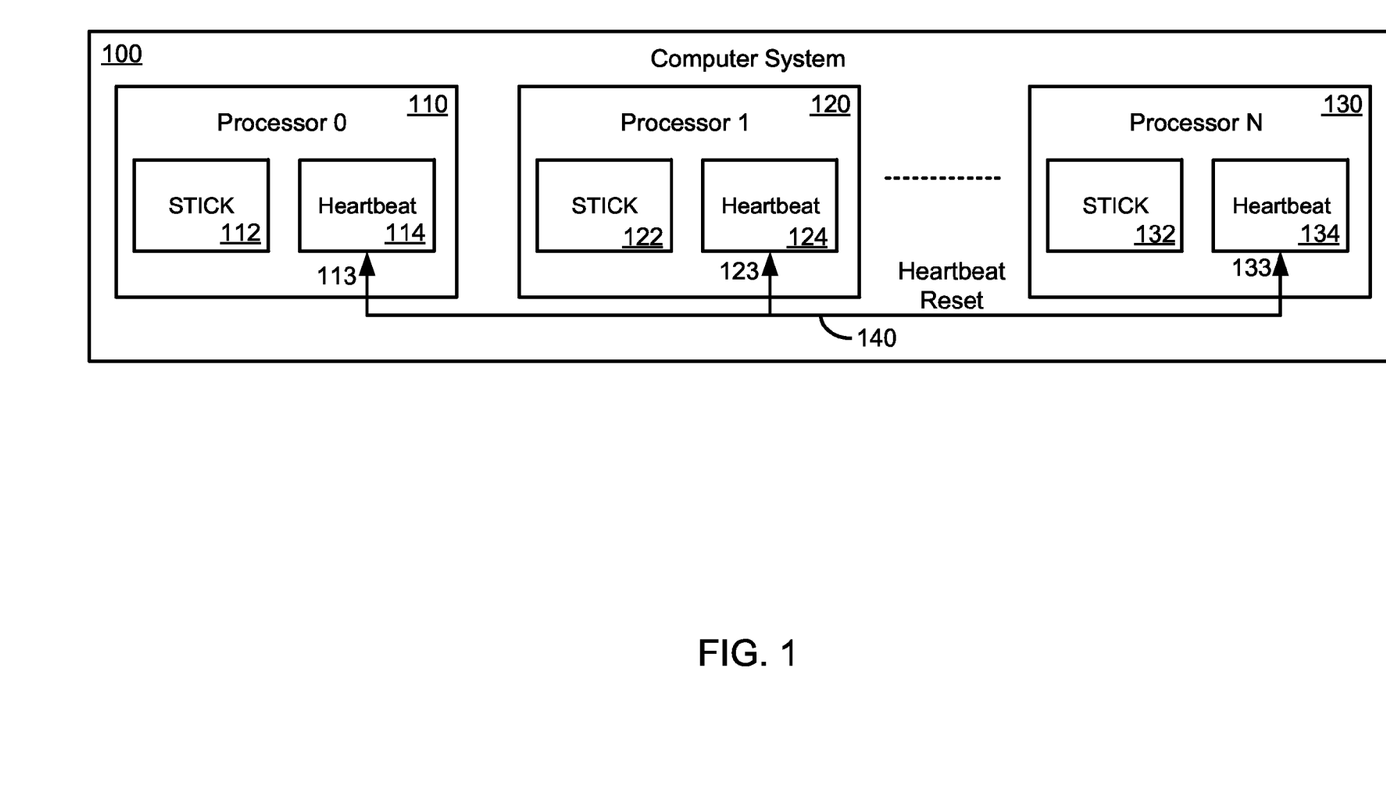
FIG. 1 is a block diagram illustrating an example of a computing system comprising a plurality of processors in communication.

FIG. 1 is a block diagram illustrating an example of a computing system comprising a plurality of processors in communication. The computer system 100 may be a typical computer workstation, server, mainframe, or any other multi-processor or multi-core processor based computer. For example, the computer may include two or more processors 110, 120, up to n number of processors 130. For various reasons, one or more of the processors of the computer system 100 may be deactivated or placed offline during operation of the computer system. For example, load conditions, maintenance requirements, or any other reason may determine when the deactivation or reactivation of a processor 110, 120, 130 of the computer system 100 occurs. Each processor 110, 120, 130 may include system synchronization devices including a local timer 112, 122, 132 (labeled in FIG. 1 as "STICK") and a global timer 114, 124, 134 (labeled in FIG. 1 as "Heartbeat"). The global and local timers may be composed of hardware devices or may be a combination of hardware and software components configured to provide a reference counter for the processor. In one example, the global and local timers may be a counting device or counter circuit that increments or decrements by a value based on a clock signal. Typically, the local timers 112, 122, 132 and global timers 114, 124, 134 for the processors of a computing system operate on the same clock signal such that operation of the timers occurs simultaneously. The computer system 100 may utilize the local timers 112, 122, 132 and global timers 114, 124, 134 for synchronizing the operation of the processors 110, 120, 130, as described in more detail below. Generally, the local timers 112, 122, 132 provide a real-time reference signal for synchronizing operations between processors and the global timer provides a reference signal from which the local timer may be synched.

Figure 7A:
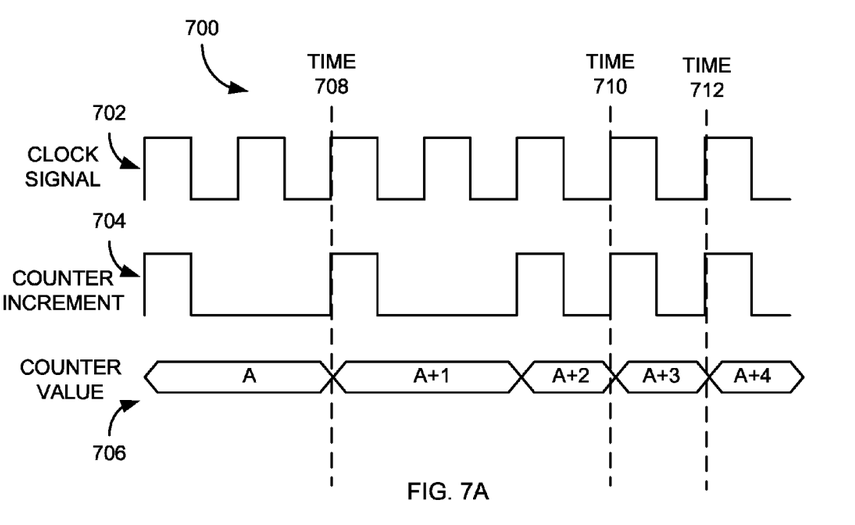
FIG. 7A is a timing diagram illustrating the addition of an increment in a counter of a computing system to account for a drift in the counter over time.
Figure 7B:
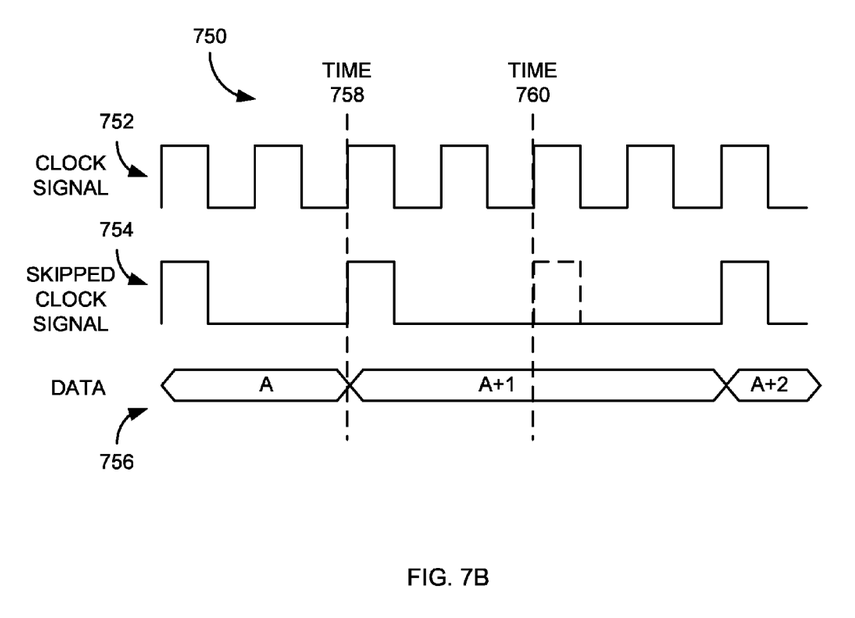
FIG. 7B is a timing diagram illustrating the delaying of an increment in a counter of a computing system to account for a drift in the counter over time.

In various embodiments and as described in more detail below with reference to FIG. 7, the computer system 100 may include any necessary additional parts required for operation as a computer, server, mainframe, or other computing device. For example, the computer system 100 may include various types of persistent and non-persistent memories, system busses, motherboards, chipsets, and I/O ports. The computer system 100 is also configured to support multiple processors, multiple processor cores and multiple multi-core processors. This includes any necessary circuitry or software required for supporting the use of multiple processors and the distribution of computing tasks amongst the processors. The division of computing tasks may be facilitated through the use of the STICK time signal on each processor. In particular, the processors or cores of the computer system may rely on the values of the STICK common time signal to synchronize the various computing tasks being executed simultaneously. Thus, proper synchronization of the STICK time signal between the various processors and/or cores ensures proper execution of an application in a parallel processing environment.

Further, the computer system 100 may also be configured to activate and/or deactivate processors in response to various system conditions. As such, the computer system 100 may include any circuitry or software required for deciding whether to activate or deactivate the various processors 110, 120, 130. For example, the computer system 100 may be configured to monitor the resource usage of each processor and determine whether to activate additional processors during high load conditions or deactivate processors during low load conditions. However, a processor that is activated from an idle state may not have a proper STICK value to synchronize execution of applications with the other processors or cores of the system. Thus, to synchronize a STICK time signal of an activated processor, the one or more global timers 114, 124, 134 of the processors may be utilized, as described below.

In the embodiment illustrated in FIG. 1, the global timers 114, 124, 134 are configured to generate a heartbeat signal. In one embodiment, the heartbeat signal may be a timer that continuously repeats from a start value to an end value, as long as the processor 110, 120, 130 is activated. In another embodiment, the global timers 114, 124, 134 may load a value from a register into a counter that counts down to zero, upon which the value is reloaded into the counter. The occurrence of the zero value defines the heartbeat signal. Thus, because the value loaded into the counter from the register is programmable, the period of the heartbeat is also programmable. In another embodiment, the global timers 114, 124, 134 may be configured to increment to a predetermined value and, upon reaching the predetermined value, restarting at zero and increment again to the predetermined value. In this embodiment, the restarting of the global timer 114, 124, 134 (or the occurrence of the zero value) indicates the "pulse" of the heartbeat signal. Thus, regardless of the embodiment used, the occurrence of the zero value in the counter may define the pulse of the heartbeat signal. As explained in more detail below, this heartbeat signal may be utilized by a computing system to initiate certain operations of the local timers to aid in synchronization of a newly active processor or core.

In addition, the global timers 114, 124, 134 of the system 100 may also include a reset link 140 connected to reset pins 113, 123, 133 located on each global timer. The resetting of the global timers 114, 124, 134 causes all of the global counters to generate their respective heartbeat signals or pulses in unison. In particular, a reset signal from a source, such as a processor, service processor, external agent, or software program tasked with synchronizing a newly activated processor or core, received at the reset pin 113, 123, 133 via a reset link 140 may be received at each global timer 114, 124, 134 and each heartbeat signal generated by the global counters are generated in unison. In general, any component of the computer system 100 or an external agent may be configured to reset the global timers 114, 124, 134.

In these embodiments, the system or local timers 112, 122, 132 are configured to store and increment the real time signal or STICK. The STICK signal represents a continuous count from when the computer system 100 is started until the computer system is turned off. The STICK may be used to synchronize the operations of the various processors 110, 120, 130 in the system. If a processor 110, 120, 130 is not activated, the processor is typically unable to keep track of the STICK such that synchronization to the STICK upon start up of a processor or core is desired.

In general, the local timer 112, 122, 132 is an ever-incrementing counter that is utilized by a processor to indicate real time. As explained above, the local counter may be configured to be written to with a value and to begin the incrementing of the counter on an enable signal or to begin incrementing once written to. For example, the local counter may be enabled to start after an initial value is written to the local counter, such as at the occurrence of a "pulse" of the heartbeat signal, as discussed in more detail below.

Figure 2:
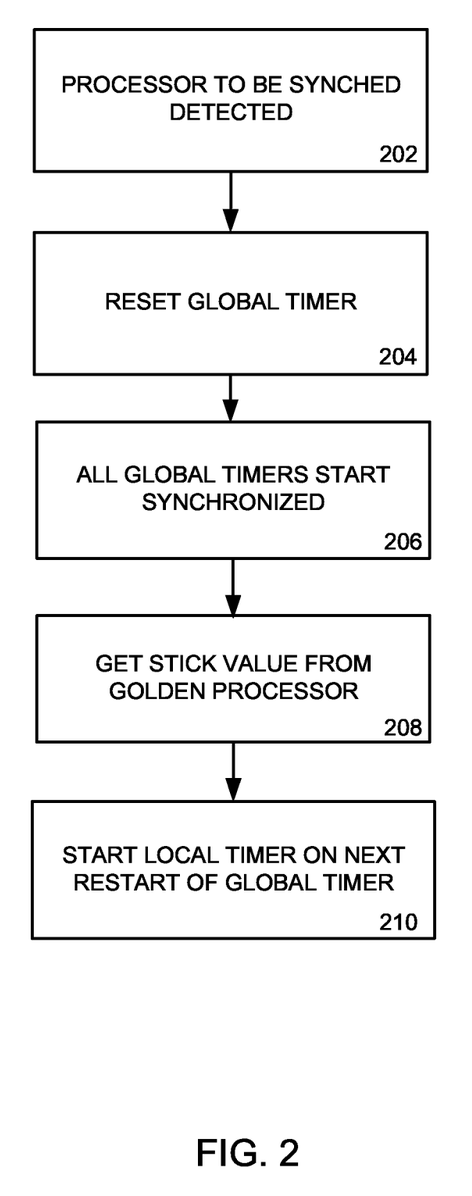
FIG. 2 is a flowchart of an example of a first method for synchronizing a reference clock of one processor with a previously operating processor.

Referring now to FIG. 2, a flow chart illustrating a method of synchronizing the STICK of a newly activated processor with the STICK of an already running processor is depicted. The operations of FIG. 2 may be performed by any component of a computing system, such as a service processor, a power-management portion of the system, the activating processor, any program executing on the computing system, such as a power-management software program, or any combination of such components. Thus, the operations of FIG. 2 may be performed through hardware, software or a combination of hardware and software.

Reference is made to the computer system 100 of FIG. 1 in discussing the operations of the flow chart of FIG. 2. The computer system 100 features at least two processors 110, 120, 130, at least one of which is powered down, deactivated, or being synchronized with other processors of the system (in this example, processor 120). Each of the active processors has a local timer 112, 132 maintaining copies of the STICK as well as a global timer 114, 134 maintaining a heartbeat signal. For some reason, in operation 202, the processor 120 is to be synchronized to the other processors of the system. When the newly activated processor is to be synched, an electronic signal is sent on the reset link 140 to each reset pin 113, 133, 123 of the global timers 114, 134 of the active processors, as well as the global timer 124 of the starting up processor in the computer system 100, resetting all the global timers to the start value in operation 204. The global timers 114, 134 may then restart, in operation 206, at substantially the same time as the global timer 124 of the starting up processor 120, resulting in nearly synchronized heartbeats. At an arbitrary "pulse" of the heartbeat signal, one of the active processors 110, 130, perhaps in response to a request from a component of the computing system, sends a current STICK value to the newly activated processor(s) 120, in operation 208. In operation 210, the newly activated processor(s) 120 may then use the STICK value that is received to populate the processor's local timer 122 and begin incrementing on the next "pulse" of the heartbeat signal.

Figure 3:
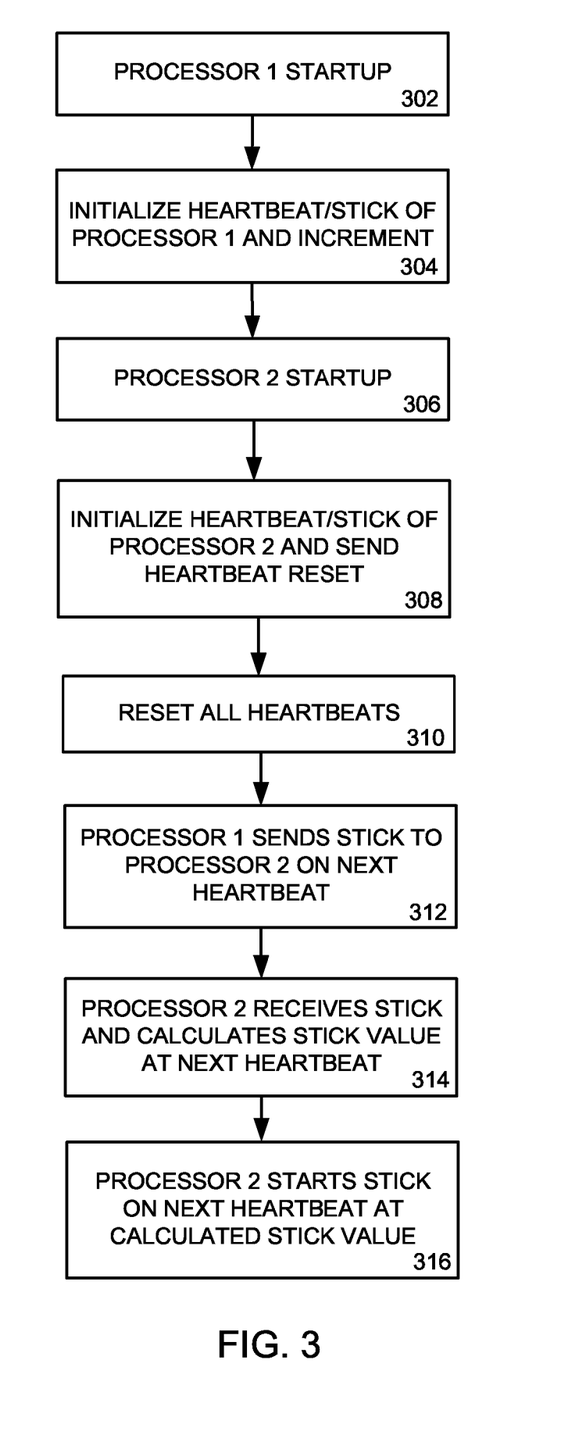
FIG. 3 is a flowchart of an example of a second method for synchronizing a reference clock of one processor with a previously operating processor.

One disadvantage to the method depicted in FIG. 2 is that some delay may occur between the transmission of the STICK value and the receiving of the STICK value at the newly active processor 120. Depending on many factors of the computer system, such as distance of transmission and clock speed of the system, this delay may cause the received STICK value to be inaccurate. Thus, FIG. 3 depicts an alternative embodiment of a method of synchronizing the STICK of a newly activated processor with the STICK of already active processor. Similar to FIG. 2, the operations of FIG. 3 may be performed by any component of a computing system.

In this embodiment, when the computing system 100 is powered on, one or more processors may be activated in operation 302. Each activated processor may then initialize both the global timers and the local timers to produce a heartbeat signal and STICK signal in operation 304. The global timers and local timers may begin incrementing after the initialization. At some later time, the computing system may determine that an additional processor should be brought online and activates the additional processor in operation 306. In operation 308, once the new processor is online, the new processor may initialize both the global timers and the local timers and send a heartbeat reset using the reset link, as described above.

In operation 310, each processor receives the reset and sets their respective heartbeats to the starting value. In addition, the current STICK value may then be sent to the newly activated processor on an arbitrary "pulse" of the heartbeat signal from one or more of the operating processors, in operation 312. In general, the period of the heartbeat is set such that the transmission of the STICK value arrives before the next "pulse" of the heartbeat signal occurs. For example, the heartbeat pulse may occur when the heartbeat signal reaches a zero value. In another example, the heartbeat pulse may occur when the heartbeat signal reaches a predetermined value and then restarts. Regardless of the embodiment used, the newly activated processor receives the STICK value between two "pulses" of the heartbeat signal. Further, because the newly activated processor has a copy of the same heartbeat signal that is synchronized at each processor, the processor can calculate the STICK value at the next "pulse" of the heartbeat signal. In particular, the processor can utilize the received STICK value and the period of the heartbeat signal to determine what the STICK value will be on the next "pulse" of the heartbeat signal in operation 314. This value may be loaded into the local counter for the newly activated processor such that, upon the subsequent "pulse" of the heartbeat signal, the local counter can be enabled and be synchronized with the other local counters in the computing system.

For example, a group of processors may be synchronized to a heartbeat signal that repeats every 10 ms. During start up of a processor, the newly added processor may received a STICK value of 1 second when the heartbeat signal value is 1 ms. However, regardless of when the STICK value is received, the newly added processor can determine that the STICK value will be 1 second plus 1 ms as the heartbeat signals are synchronized and the STICK value was transmitted at the pulse of the heartbeat signal. Thus, the newly added processor can load a value of 1.001 seconds and can start incrementing the local timer or calculate that the STICK value at the next heartbeat will be 1.010 seconds and can start incrementing the local timer at that value at the next heartbeat pulse. Thus, the newly activated processor may then add the heartbeat period to the received STICK value and on the next heartbeat, the newly activated processor may then begin incrementing the STICK and operating in conjunction with the other active processors, in operation 316.

The mechanisms and methods described above may be used in computing systems that share a common system clock. For example, a reference clock signal from a crystal oscillator may provide the various clock signals to the processors of the system. Thus, because the various clock signals originate from the same common clock signal, the clock signals are synchronized. However, in some computer system configurations, the processors of the system include their own separate clock signals. For example, a first processor may include a crystal oscillator that provides the clock signal for that particular processor, while a second processor of the same computer system may use a different crystal oscillator to provide that clock signal for the second processor. As such, the processors of the computer system may be operating on different clock signals generated by separate clock sources.

Although some care may be taken in selecting clock sources for the processors of the computer system so that the clock sources are similar, variability in the clock sources may result in the processors of the computer system receiving slightly different clock signals. In such cases, a drift may occur over time in groups of processors that operate on the different clock signals. For example, over time, a STICK counter of one processor may not be in sync with the STICK counter of another processor as each STICK counter operates on the respective clock signals for the processors. To address the discrepancy between the STICK values for the processors of the computer system due to a drifting of the STICK value over time, the computer system may utilize a drift compensation mechanism or method. The drift compensation may adjust the STICK value for one or more of the processors of the computer system to account for the differences in STICK values between the processors. By adjusting for drift in STICK value over time in the processors, the designer of the computer system is free from having to design a single common clock signal for operating the STICK counters of the processors. Embodiments of methods and systems for providing this drift compensation in one or more processors of a computer system are described below.

Figure 4:
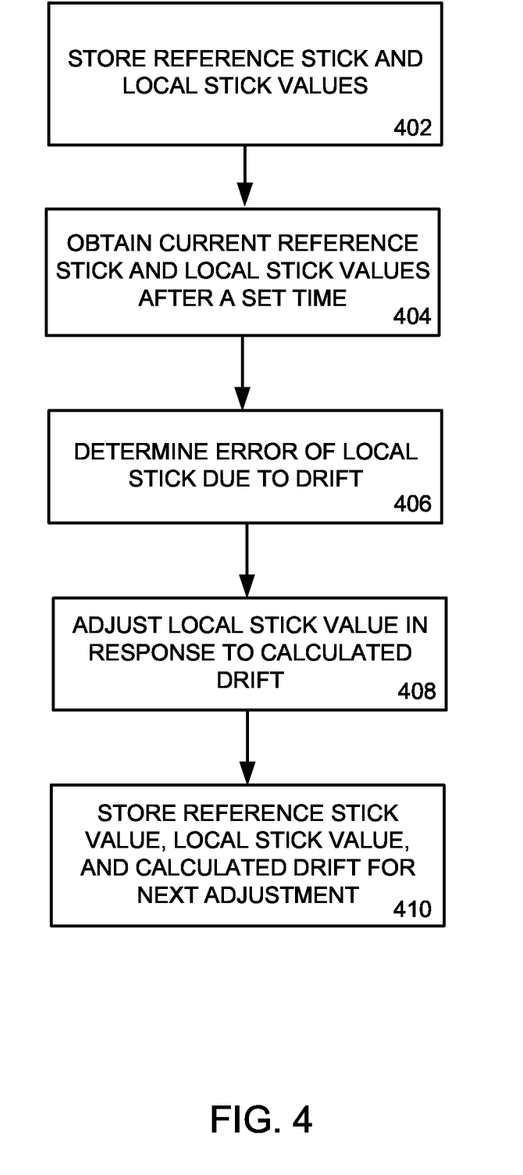
FIG. 4 is a flowchart of a method for synchronizing a local counter of one processor with a reference counter of a different processor of a computer system.

In particular, FIG. 4 is a flowchart of a method for synchronizing a local counter of one processor with a reference counter of a different processor of a computer system. In general, the operations of FIG. 4 may be performed by any portion or circuit of a computer system. In one particular example (and used herein to describe the method), the operations are performed by a processor of a computer system that includes a STICK counter utilized to determine a real-time clock signal to pace the executing applications to real-time. Further, the operations may be performed through hardware of the processor, one or more software programs executed by the processor, or a combination of both hardware components and software programs. As described in more detail below, the processor may be in communication with another portion of the computer system, such as another processor or an external reference clock signal.

In operation 402, the processor may store the values of a local STICK counter and a "reference" STICK counter. As described above with reference to FIG. 1, the processor 110 may include a local STICK counter 112 that stores a continuously incremented value used to determine a real-time clock signal. In addition, other processors 120,130 of the same computer system 100 may also include STICK counters. Communication between the processors allows for one processor to obtain and/or receive the STICK counter value from another processor. Further, in one embodiment, the processor 110 may designate another processor 120,130 of the computer system 100 as a reference for synching STICK values to compensate for drift in the STICK value. In another embodiment, the processor may designate an external reference counter to synch the local STICK counter to compensate for drift. Thus, the processor may receive and store a STICK value received from the reference processor or external reference. In general, the reference STICK value may be received from any source of the computer system. Also, the local STICK counter value and the reference STICK counter value may be stored as the previous local STICK value and the previous reference STICK value, as described in more detail below.

After some time, the processor obtains or receives a current reference STICK counter value and a current local STICK counter value in operation 404. In general, the amount of time that passes between the storing of the previous STICK values and the current STICK values may be any amount of time. In one embodiment, the amount of time between the STICK value readings is one second. Due to read errors occurring during the reading of the STICK counters, the amount of time between the previous reads and the current reads may be sufficient to minimize the effect of the read errors. In one embodiment, the one second time between storing the previous STICK values and storing the current STICK values may be based on the local clock signal particular to the processor compensating for drift.

In operation 406, the processor may use the stored STICK values to determine an error in the local STICK counter relative to the reference STICK counter due to drift. Such drift may be related to the processor utilizing a clock signal slightly different from the clock signal of the reference STICK counter. Because the STICK counters operate from a local clock signal, variability between the local clock signal to the processor and the clock signal to the reference processor may cause the STICK counters to include separate values over time. The error between the reference STICK counter value and the local STICK counter value may be referred to as the error in the local STICK due to clock drift. The calculations utilized by the processor to determine the drift error of the local STICK counter are described in more detail below with reference to FIG. 5.

Once the drift error of the local STICK is calculated, the processor may adjust the local STICK counter value accordingly in operation 408. In general, the adjustment to the local STICK counter value includes increasing the STICK counter update rate if the local STICK has drifted slower than the reference STICK or slowing the STICK counter update rate if the local STICK has drifted faster than the reference STICK. As explained in more detail below, the local STICK counter increments at a rate equal to one-half the system clock frequency. In other words, the local STICK counter increments on every two system clock cycles. Adjusting the local STICK counter may include incrementing the counter on every clock cycle for a period of time to speed up the STICK counter or to prevent some of the incrementing of the STICK counter for a period of time to slow down the STICK counter. One particular embodiment to adjust the local STICK counter value in response to the reference STICK value is discussed in more detail below with reference to FIG. 6.

After adjusting the local STICK update rate, the processor may store in operation 410 some of the values obtained or received above for use in future adjustments to the local STICK update rate. In particular, the current local STICK value may be stored as the new previous local STICK value for use in the next adjustment. Further, the current reference STICK value obtained above may be stored as the previous reference STICK value. Also, the current calculated drift or error may be stored as the previous error or drift for use in the next adjustment to the local STICK update rate. In this manner, the next adjustment to the local STICK update rate may not perform operation 402 described above, but may instead use the values stored in operation 410 for the next STICK adjustment.

Figure 5:
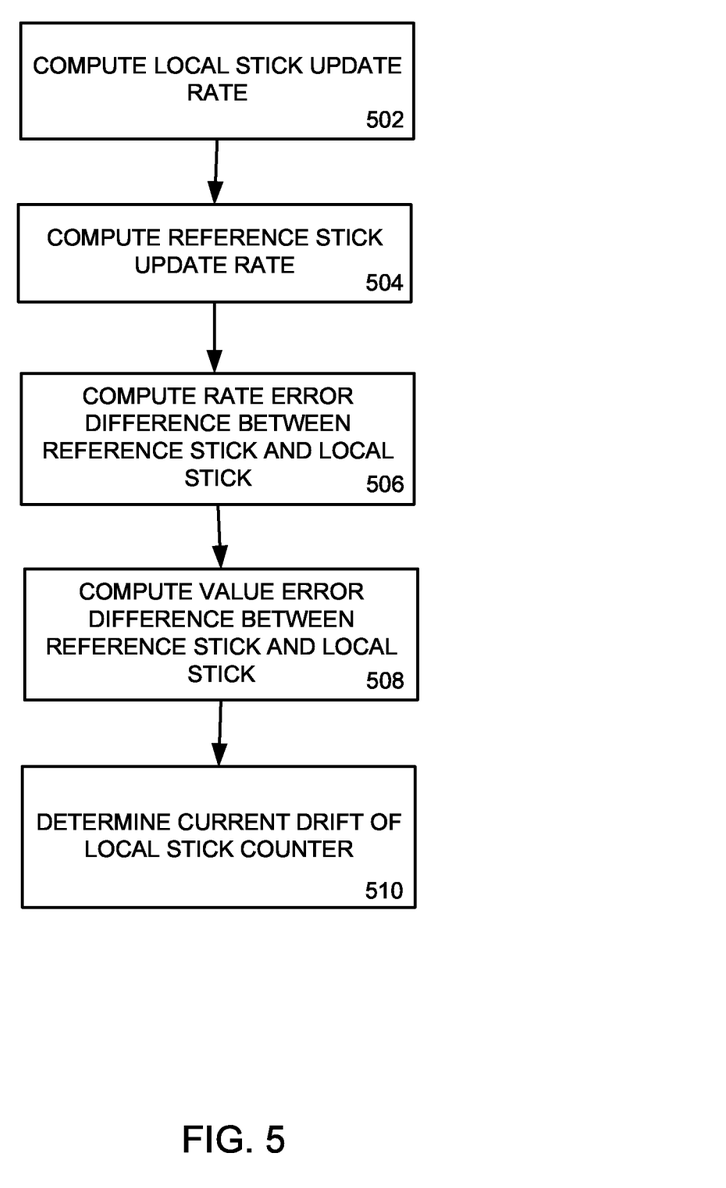
FIG. 5 is a flowchart of a method for determining an error in a local counter of one processor compared with a reference counter of a related processor.

As mentioned above, the processor may accumulate a drift error in the local STICK counter due to drift of the difference in system clocks of the computer system. In particular, FIG. 5 is a flowchart of a method for determining an error in a local STICK value of one processor compared with a reference STICK value in a related processor. The operations of FIG. 5 may be performed by the processor as part of operation 406 described above. As such, the operations may be performed through hardware of the processor, one or more software programs executed by the processor, or a combination of both hardware components and software programs.

In operation 502, the processor determines the update rate of the local STICK counter. In particular, the processor may subtract a previous local STICK counter value from a current local STICK counter value (obtained after a particular period of time from when the previous local STICK counter value is obtained). As mentioned above, the processor may obtain a local STICK value and a reference STICK value and store those values as previous STICK values. Then, after a period of time, the processor may obtain a current local STICK value and a reference STICK value. Thus, the processor may determine the update rate of the local STICK counter by subtracting the previous local STICK counter value from the current local STICK counter value. In this document, the update rate of the local STICK counter is referred to as "DL", or the delta of the local STICK.

Similarly, in operation 504, the processor determines the update rate of the reference STICK counter by subtracting a previous reference STICK counter value from a current reference STICK counter value (obtained after a particular period of time from when the previous reference STICK counter value is obtained). In one embodiment, the period of time between the previous reference STICK value and the current reference STICK value is the same as the period of time between the previous local STICK value and the current local STICK value. In this document, the update rate of the reference STICK counter is referred to as "DR", or the delta of the reference STICK. Also, in operation 506, the processor calculates a difference between the local STICK update rate (DL) and the reference STICK update rate (DR) by subtracting the local STICK update rate from the reference STICK update rate. In this document, the update rate difference of the reference STICK counter and the local STICK counter is referred to as "D", such that the processor calculates D=DR−DL.

In operation 508, the processor also calculates a difference in the local STICK counter value and the reference STICK counter value by subtracting the current local STICK counter value from the reference STICK counter value. Ideally, the local STICK counter value and the reference STICK counter value are equal as the counters were started at the same time, as described above. However, due to drift of the local STICK counter during operation of the processor, a difference in the values of the counters may be present. As such, the value error (referred to herein as "DV") is calculated by the processor and used to determine the local counter error. In particular, in operation 510, the processor calculates the current local STICK counter drift error by adding the calculated update rate difference (D) to the calculated value error (DV). In one embodiment, the calculated current local STICK counter drift error may also include a previous drift error stored in memory of the processor. In this manner, the processor may utilize the local STICK counter value and the reference STICK counter value to determine drift in the local STICK counter due to fluctuations in the system clocks of the computer system during operation. Also, as discussed below, this calculated drift error in the local STICK counter may be used to adjust the local STICK counter to account for the calculated drift error.

Figure 6:
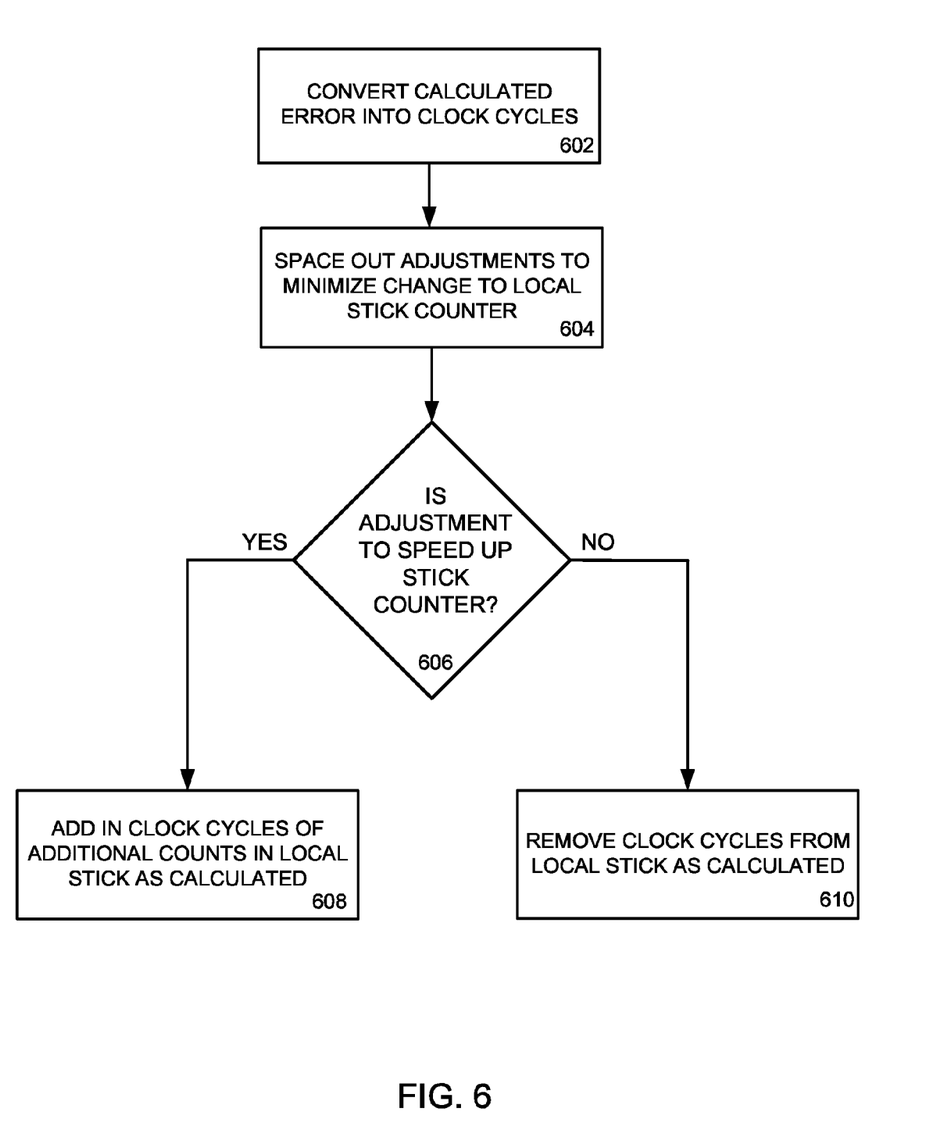
FIG. 6 is a flowchart of a method for adjusting a local clock of a processor in response to a calculated error relative to the reference counter.

In particular, FIG. 6 is a flowchart of a method for adjusting a local STICK counter of a processor in response to a calculated error relative to the reference STICK counter. The operations of FIG. 6 may be performed by the processor as part of operation 408 described above. As such, the operations may be performed through hardware of the processor, one or more software programs executed by the processor, or a combination of both hardware components and software programs.

In operation 602, the processor converts the calculated error determined above into an adjustment to the local STICK counter of the processor. As explained above, the local STICK counter increments at a rate equal to one-half the system clock frequency. In other words, the local STICK counter increments on every two system clock cycles. Adjusting the local STICK counter may include incrementing the counter on every clock cycle for a period of time to speed up the STICK counter or to prevent the incrementing of the STICK counter for a period of time to slow down the STICK counter. Thus, the processor may convert the calculated error in the local STICK counter due to drift into one or more extra clock cycles or skipped cycles of the system clock, as seen by the STICK counter. In particular, and as described in more detail below, the processor may determine the increase or decrease in the value of the local STICK to account for the drift and a number of additional or fewer increments of the local STICK counter associated with the increase or decrease in value. In one embodiment, the processor utilizes the calculated error to determine an adjustment value to the local STICK counter through the equation: current error/(local STICK update rate+current error).

In operation 604, the processor modifies the calculated adjustment to the local STICK counter to minimize the impact of the adjustment to the local STICK counter. For example, an adjustment to the counter may be calculated to include several hundred additional increments of the local STICK counter. Applying all of the adjustment increments to the local STICK counter as quickly as possible may negatively impact the local STICK counter function, as well as increasing the disparity between the local STICK counter value and the reference STICK counter value for some time. To insure that the adjustment to the local STICK counter is done in a manner that lessens the impact to the function of the local STICK counter, the processor may space out the adjustments so that the impact to the counter is minimized. In one particular embodiment, the processor may reduce the calculated adjustment by a factor to reduce the interval between the adjustments. In one example, the calculated adjustment may be reduced by a factor of 2^20. Regardless of the mechanisms through which the spacing out of the adjustments is determined, the processor minimizes the frequency of the adjustments to the local STICK counter such that the effect to the functionality of the counter is lessened.

In operation 606, the processor may determine if the adjustment to the local STICK counter includes additional increments to the counter (to speed up the counter) to match the reference STICK counter or includes delaying increments to the counter (to slow down the counter) to match the reference STICK counter. If the local STICK counter is to be sped up to adjust for a calculated drift in the counter, the processor adds one or more additional increments to the local STICK counter in operation 608. The addition of increments (based on the system clock cycle of the processor) is shown in FIG. 7A. As shown in FIG. 7A and mentioned above, the local STICK counter increments on every other system clock cycle. Thus, in the timing diagram

700, a clock signal 702 is provided. A counter increment signal 704 is also indicating when the STICK counter is incremented. The value retained by the STICK counter is shown in the counter value signal 706. At the beginning of the timing diagram 700, the STICK counter retains a value "A". Two clock cycles later (at time 708), the STICK counter increments 704 such that the counter value becomes "A+1" 706. Two cycles later, the counter increments again and the counter value becomes "A+2".

Before time 710 of the timing diagram 700, the counter operates normally, incrementing every two system clock cycles 702. However, based on the operations discussed above, the local STICK counter may be adjusted due to drift in the counter when compared to a reference STICK counter. To add additional increments to the local STICK counter, the processor may be configured to increment the counter on every clock cycle, rather than every other clock cycle. This adjustment may occur spread out over a period of time to minimize the impact of the adjustment on the counter. As shown at time 710 in FIG. 7A, the counter may increment 704 on the off clock cycle 702 to provide an additional increment between the normal increments of the counter. Thus, rather than incrementing to "A+3" at time 712, the counter value now equals "A+4" as an additional increment occurred at time 710. In this manner, the processor may add additional increments into the counter value in response to a calculated drift in the local STICK counter. As mentioned above, these additional increments may be spread out over time to minimize the impact of the adjustments to the counter.

Returning to FIG. 6, if the local STICK counter is to be slowed down to adjust for a calculated drift in the counter, the processor delays one or more increments to the local STICK counter in operation 610. The delay or removal of increments (based on the system clock cycle of the processor) is shown in FIG. 7B. As shown in FIG. 7B, the timing diagram 750 illustrates a clock signal 752, a counter increment signal 754 indicating when the STICK counter is incremented and the value retained by the STICK counter 706. At the beginning of the timing diagram 700, the STICK counter retains a value "A". Two clock cycles later (at time 758), the STICK counter increments 754 such that the counter value becomes "A+1" 756.

Based on the operations discussed above, the local STICK counter may be adjusted due to drift in the counter when compared to a reference STICK counter. In particular, one or more increments may be removed or delayed by the processor to adjust the STICK counter. Similar to the adjustments described above, this adjustment may occur spread out over a period of time to minimize the impact of the adjustment on the counter. As shown at time 760 in FIG. 7B, the processor causes the counter to not increment on the second clock cycle from the last increment. Thus, rather than incrementing, the counter value now equals remains "A+1" for four clock cycles, effectively removing an increment of the counter. In this manner, the processor may remove or delay increments of the counter value in response to a calculated drift in the local STICK counter. As mentioned above, these delayed increments may be spread out over time to minimize the impact of the adjustments to the counter.

Although discussed above in relation to a STICK counter that increments on every other clock cycle, the same adjustment mechanism may apply to counters that increment on any rate of the clock cycle. For example, in the embodiment discussed above, over four cycles of the clock signal, the STICK counter may be incremented twice for a normal rate, once for a slower rate, or three times for an increased rate of incrementing. In a similar manner, the rate of incrementing the STICK counter may be based on any number of clock cycles. For example, over six clock cycles, the STICK counter may be increased by incrementing for five or four of the six clock cycles. In general, any increase or decrease in the rate at which the STICK counter increments relative to the clock signal is contemplated. In addition, adjustment to the STICK counter may be performed by adding or removing a delay in the PLL feedback loop of the clock circuit.

Through the methods and systems described above, a processor of a computing system may adjust a STICK counter in response to a measured or calculated drift in the counter. Such a drift may be caused by utilizing separate system clocks for the processors of the system. As such, it is not required that the computing system utilize a "golden" reference STICK counter to which each other STICK counter in the system is synchronized. Rather, any local STICK counter may synchronize to any other STICK counter of the system. For example, the computing system may implement a hierarchical sequence where one processor or set of chips sync to a particular reference and then other processors or sets of chips syncs to the secondary processor. Further, if more than one processor or chip shares a system clock, the adjustment calculated for one processor STICK counter may be applied to the related processor as the system clocks will drift the same amount.

Figure 8:
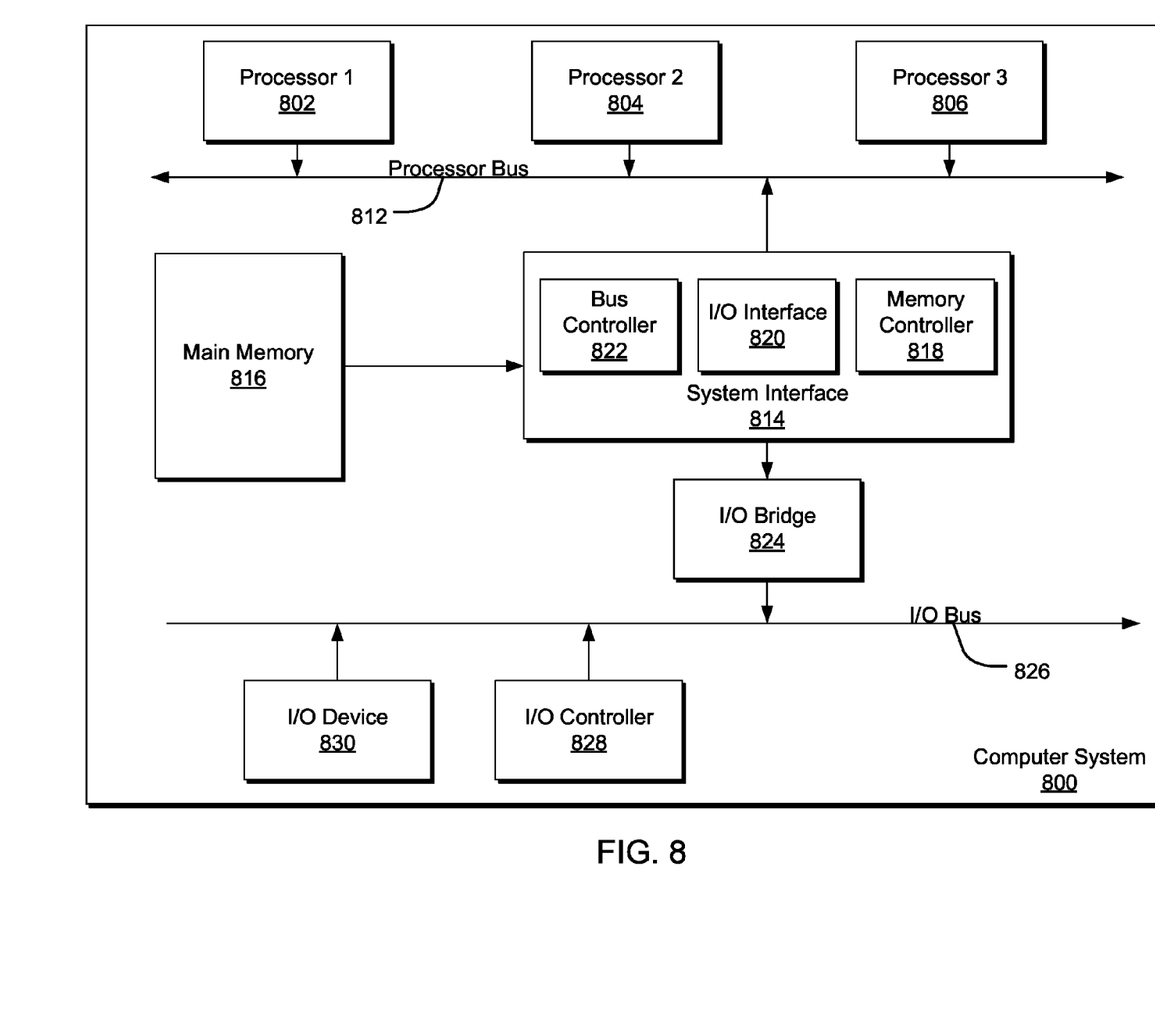
FIG. 8 is a block diagram illustrating an example of a computing system which may be used in implementing embodiments of the present disclosure.

FIG. 8 is a block diagram illustrating an example of a computing device or computer system 800 which may be used in implementing the embodiments of the circuit design disclosed above. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 2-6 are illustrative only. Alternative embodiments of the present invention may add operations, omit operations, or change the order of operations without affecting the spirit and scope of the present invention. The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for operating a counter in a processor of a computing system, the method comprising:
   storing a first value of a local counter device of the processor of the computing system and a first value of a reference counter device, the local counter device configured to output an incrementing value based on a first clock signal and the reference counter device configured to output an incrementing value based on a second clock signal;
   a period of time after storing the first value of the local counter device, obtaining a current value of the local counter device and a current value of the reference counter device;
   calculating a drift in the local counter device by subtracting an update rate of the local counter device from an update rate of the reference counter device to obtain an update rate mismatch value;
   calculating a counter value mismatch by subtracting the current value of the local counter device from the current value of the reference counter device; and
   adjusting a rate of incrementing of the incrementing value of the local counter device at least in response to the calculated drift in the local counter device and the counter value mismatch, wherein the calculated drift equals the update rate mismatch value plus the counter value mismatch.

2. The method of claim 1 wherein the first clock signal is different from the second clock signal.

3. The method of claim 2 wherein calculating the drift in the local counter device comprises subtracting the first value of the local counter device from the current value of the local counter device to determine the update rate of the local counter device.

4. The method of claim 3 wherein calculating the drift in the local counter device further comprises subtracting the first value of the reference counter device from the current value of the reference counter device to determine the update rate of the reference counter device.

5. The method of claim 2 further comprising converting the calculated drift into an adjustment value, the adjustment value corresponding to one or more clock cycles of the first clock signal.

6. The method of claim 5 wherein adjusting the rate of incrementing of the incrementing value of the local counter device comprises increasing the rate of incrementing of the incrementing value local counter device relative to the first clock signal over a time period of a plurality of clock cycles of the first clock signal based at least on the adjustment value of the first clock signal.

7. The method of claim 5 wherein adjusting the rate of incrementing of the incrementing value of the local counter device comprises decreasing the rate of incrementing of the incrementing value local counter device relative to the first clock signal over a time period of a plurality of clock cycles of the first clock signal based at least on the adjustment value of the first clock signal.

8. The method of claim 5 wherein adjusting the rate of incrementing of the incrementing value of the local counter device comprises adjusting a delay of the first clock signal based at least on the adjustment value of the first clock signal.

9. A computer system comprising:
   a first processor comprising a local counter device configured to output an incrementing value based on a first clock signal;
   and a second processor comprising a reference counter device configured to output an incrementing value based on a second clock signal, the second clock signal different than the first clock signal;
   wherein the computer system is configured to:
      store a first value of the local counter device of the first processor and a first value of the reference counter device of the second processor;
      a period of time after storing the first value of the local counter device, obtain a current value of the local counter device and a current value of the reference counter device;
      calculate a drift in the local counter device by subtracting an update rate of the local counter device from an update rate of the reference counter device to obtain an update rate mismatch value;

calculate a counter value mismatch by subtracting the current value of the local counter device from the current value of the reference counter device; and adjust a rate of incrementing of the incrementing value of the local counter device at least in response to the calculated drift in the local counter device and the counter value mismatch, wherein the calculated drift equals the update rate mismatch value plus the counter value mismatch.

10. The computer system of claim 9 wherein the computer system is further configured to subtract the first value of the local counter device from the current value of the local counter device to determine the update rate of the local counter device.

11. The computer system of claim 10 wherein the computer system is further configured to subtract the first value of the reference counter device from the current value of the reference counter device to determine the update rate of the reference counter device.

12. The computer system of claim 9 wherein the computer system is further configured to convert the calculated drift into an adjustment value, the adjustment value corresponding to one or more clock cycles of the first clock signal.

13. The computer system of claim 12 wherein the computer system is further configured to adjust the rate of incrementing of the incrementing value of the local counter device by increasing the rate of incrementing of the incrementing value local counter device relative to the first clock signal over a time period of a plurality of clock cycles of the first clock signal based at least on the adjustment value of the first clock signal.

14. The computer system of claim 12 wherein the computer system is further configured to adjust the rate of incrementing of the incrementing value of the local counter device comprises decreasing the rate of incrementing of the incrementing value local counter device relative to the first clock signal over a time period of a plurality of clock cycles of the first clock signal based at least on the adjustment value of the first clock signal.

* * * * *